United States Patent [19]

Delabastita

[11] Patent Number: 5,774,229
[45] Date of Patent: Jun. 30, 1998

[54] HALFTONE SCREEN GENERATOR AND HALFTONE SCREEN AND METHOD FOR GENERATING SAME

[75] Inventor: Paul A. Delabastita, Antwerp, Belgium

[73] Assignee: AGFA-Gevaert, Mortsel, Belgium

[21] Appl. No.: 489,008

[22] Filed: Jun. 8, 1995

Related U.S. Application Data

[63] Continuation of Ser. No. 930,289, Aug. 17, 1992, abandoned.

[51] Int. Cl.[6] ........................................ H04N 1/40
[52] U.S. Cl. .......................................... 358/298; 258/459
[58] Field of Search ..................... 358/296, 298, 358/443, 448, 454, 459, 530, 534, 536; 395/110; 382/254; 283/69, 93

[56] References Cited

U.S. PATENT DOCUMENTS

| 4,149,183 | 4/1979 | Pellar | 358/75 |
|---|---|---|---|
| 4,185,304 | 1/1980 | Holladay | 358/298 |
| 4,350,996 | 9/1982 | Rosenfeld | 358/75 |
| 4,456,924 | 6/1984 | Rosenfeld | 358/75 |
| 4,499,489 | 2/1985 | Gall et al. | 358/75 |
| 4,680,645 | 7/1987 | Dispeto et al. | 358/298 |
| 4,700,235 | 10/1987 | Gall | 358/298 X |
| 4,918,622 | 4/1990 | Granger et al. | 358/298 X |
| 4,924,301 | 5/1990 | Surbrook | 358/75 |
| 5,109,283 | 4/1992 | Carley | 358/298 |
| 5,111,302 | 5/1992 | Chan et al. | 358/298 |
| 5,197,765 | 3/1993 | Mowry, Jr. et al. | 283/93 |
| 5,239,391 | 8/1993 | Hamilton | 358/459 |
| 5,253,084 | 10/1993 | Rylander | 358/298 X |
| 5,315,407 | 5/1994 | Sakamoto et al. | 358/459 X |

Primary Examiner—Eric Frahm
Attorney, Agent, or Firm—Richard J. Birch

[57] ABSTRACT

A halftone screen generator, halftone screen and a method for making the halftone screen are described. The halftone screen has a screen angle and rulings that define the theoretical centers of gravity of the halftone dots. The actual centers of gravity of the halftone dots are displaced from the theoretical centers of gravity by the length and angle of random phase vectors. In one example, the positional displacement of the centers of gravity of the dots is dot size dependent in an inverse relationship. The shift in dot centers of gravity away from the theoretical centers of gravity defined by the halftone screen effectively breaks up screen "patterning" and avoids objectionable halftone "graininess".

8 Claims, 20 Drawing Sheets

HALFTONE SCREEN GENERATOR AND HALFTONE SCREEN AND METHOD FOR GENERATING SAME

This is a continuation of application Ser. No. 8/930,289 filed on Aug. 17, 1992 now abandoned.

BACKGROUND OF THE INVENTION

The invention relates to halftone screening in general and, more particularly to electronic halftoning for the reproduction of tints and images on, for example, offset printing presses.

Offset presses behave like binary devices, in that they can only print "ink" or "no ink" at a given location of the substrate, rather than being capable of locally modulating the thickness or concentration of the ink. In order to render different tones and colors, necessary for the reproduction of images and tints, geometrical patterns are used of dots, of which the size is modulated. This process is called halftoning, and the dots that make up the pattern are called "halftone dots". The pitch of the dot pattern is fine enough not to be objectionable to the eye. Instead, the eye will perceive the "integrated density" that corresponds to the average coverage of the substrate with ink.

For digital halftoning high resolution laser recorders are used to generate halftone dots on a photographic film or plate. The laser beam scans the film or plate on a line-by-line basis. Within every line the laser beam can be modulated "on" or "off" at discrete positions. In this way, an addressable grid is formed of lines and columns. The smallest addressable unit of this grid can conveniently be called a "micro dot" (as opposed to the word "dot" which is reserved to refer to the halftone dots themselves). The pitch of the grid is usually the same in the horizontal and vertical directions, and lies in the range from 0.25 to 1.00 thousands of an inch, corresponding to recorder resolutions of 4000 to 1000 micro dots/inch, respectively. Halftone dots are then built by turning the laser on and off in such a way that contiguous clusters of micro dots are written on the addressable grid, the size of which corresponds to the desired local tone level. FIG. 1 depicts how the different shades of a degrade are rendered by means of digital halftone dots with different sizes.

The generation of a halftone dot pattern on a fixed resolution grid involves a number of trade-offs. The fact that the dots are "built" by clustering micro dots, results in spatial discretization effects. These effects can be classified into three categories:

1) Discretization of the possible SIZES of the dots. The size difference between two dots corresponds always to an integer number of micro dots.
2) Discretization of the microscopic SHAPE of the dots. Since the micro dots that make up the dot boundary are positioned on an orthogonal grid, the dot boundaries will always be a "serrated version" of what the mathematical dot boundary description predicts.
3) Discretization of the dot POSITION. The gravity center of a cluster of micro dots that makes up a halftone dot does not necessarily coincide exactly with the location of the dot centers as predicted by the mathematical halftone description.

The following discussion concentrates on the two latter problems: discretization of dot SHAPE and POSITION.

Although the serration itself of the dot shape is usually invisible, it can indirectly affect the size of the halftone dot as it will appear after exposure and development of the film. The causes for this are complex and involve non-linearities and asymmetries in the film/recorder system. This can be demonstrated by a simplified example.

FIG. 2a illustrates how the energy of a scanning laser beam in an image recorder rises and falls in time when an optical modulator turns it "on" and "off". Also indicated is the "developly level" of energy at which the exposed film will start to become black when it is developed. It is assumed in FIG. 2a that the scanning laser beam has the shape of a line, perpendicularly oriented to the scanning direction and a length equal to the distance between two successive scanning lines. FIGS. 2b and 2d indicate how long the black lines would be on the film if the modulator turns on the laser beam during one micro dot (FIG. 2b) and during two mocro dots (FIG. 2d). FIGS. 2c and 2e depict the black area that would result on the film for a halftone dot formed of two (2) vertically and two (2) horizontally oriented micro dots. It can be seen from the Figures that both halftone dots are imaged with DIFFERENT SIZES on the film.

If a halftone dot pattern is generated in which these two kinds of halftone dots occur in groups, as for example in FIG. 3, an objectionable low frequency periodical DENSITY pattern will be introduced caused by the difference in size between the dots that are imaged larger and smaller because of the film/recorder characteristics.

Since, as just explained, the dot boundaries of halftone dots on film are approximations of what their mathematical description would predict, it is to be expected that this will affect the location of the gravity center of the halftone dots. FIG. 4 illustrates how the "theoretical" and "actual" center of gravity of halftone dots can differ for a halftone dot of two horizontally oriented micro dots and two vertically oriented micro dots. The inconsistency between the theoretical and actual dot centers can be viewed as a local "phase distortion" of the created versus the theoretical halftone dot screen. Another way of looking at this periodical phase distortion is to consider it as a moire interaction between the frequencies of the halftone screen and the recorder grid.

The coordinates (xa,ya) of the actual center of gravity of a halftone dot consisting of N micro dots is given by:

$$xa = \sum_{i=1}^{N} xi/N \qquad (1)$$

$$ya = \sum_{i=1}^{N} yi/N$$

From this formula it can be seen that the actual center of gravity can better approximate the theoretical center of gravity if the halftone dot is formed from of large numbers of micro dots. Given the presence of N in the nominator, the "corrections" to converge both can be made smaller if N is large.

Phase distortions in halftone screens can be quite visible to the eye. If they are random (in angle and amplitude), they make the halftone screen look "noisy" or grainy. If they are periodical, they introduce "patterning" as shown in FIG. 3. On most rows and columns, a series of "horizontal" and "vertical" dots alternate, which introduces a periodical phase distortion of the halftone screen in both dimensions. Since the period of this phase distortion is much longer than the period of the halftone screen itself, it will be visible when looked at under normal scaling conditions.

Several techniques have been described in the patent literature to break up the patterning that results from these periodical shape and phase variations. The three most representative cases are all based on the introduction of a random element to "break up" the periodicity of the shape and phase variations.

FIG. 5 depicts the essential parts of a halftone screen generator as it is described by Rosenfeld (in U.S. Pat. Nos. 4,350,996 and 4,456,924) and by Gall (in U.S. Pat. Nos. 4,499,489 and 4,700,235). At the recorder grid position (i,j) with physical coordinates values Ui and Vj, the value of the pixel that is to be halftoned is P(i,j). The position coordinate pair (Ui,Vj) of the recorder is, by means of a coordinate transformation unit (designed to scale, rotate and shift coordinate pairs), converted into the screen position coordinate pair (Xi',Yj'). Based on the fact that the screen function is periodical, a sampled version of only one screen function period is stored in a M×M matrix memory. Therefore, the screen position coordinates Xi' and Yj' are mapped, by means of a modulo M operation into coordinate values (Xi,Yj) of that one period. The coordinates (Xi,Yj) address a threshold value T(i,j), which is then compared with the original pixel value P(i,j). Depending on the outcome of this comparison, a "black" or "white" micro dot will be written by the recorder on the screen. A variation on this technique, in which the "thresholding mechanism" is replaced by precalculated "bitmap caches", is described by Granger in U.S. Pat. No. 4,918,622.

There are several ways to introduce a random element to break phase deviation periodicity. In one method, two numbers Xn, and Yn, generated by a random generator and uniformly distributed within a certain range, are added to the screen coordinate values Xi' and Yi'. This will vary the location of the halftone dot boundary in a probabilistic manner, and spread the energy of the periodic phase deviation across an address band surrounding the halftone dot boundary. FIG. 6 illustrates this method, which is also explained in U.S. Pat. Nos. 4,499,489 and 4,918,622.

In FIG. 6a, the black square indicates the "theoretical" boundary of a halftone dot. The black circles show how this area is approximated by a cluster of micro dots. As is seen in the Figure, the "actual" center of gravity of the cluster of micro dots does not coincide with the theoretical center thereby introducing a phase error. FIG. 6b illustrates the situation in which random numbers, uniformly distributed between −0.5 and +0.5 times the recorder pitch, are added to the position coordinates of the theoretical dot boundary. This range is indicated in FIG. 6b by the inner and outer squares. The "gray" circles represent micro dots that are assigned OR not assigned to the halftone dot in a probabilistic manner. The outcome of this process, for example, can be the one that is shown in FIG. 6c. The total number of micro dots is the same, but the location of the "actual" center of gravity is much nearer to the "theoretical" one.

A second method, described in U.S. Pat. No. 4,700,235 makes use of not one, but several memories each containing a prestored halftone period. The phase of these prestored periods is set slightly different. A random generator on FIG. 5 produces numbers "Sn" that determine WHICH of the available prestored screen periods is sampled to obtain a threshold value. The net result of this operation is comparable to what was described in the first method.

A third method, described in U.S. Pat. No. 4,456,924, simply consists of adding random numbers "Tn" with a certain range to the threshold values that result from sampling of the screen period. This method has no effect on the phase of the resulting cluster of micro dots, but it is capable of "masking" the low frequency patterning that results from the periodical phase deviations.

All of the above methods have the disadvantage that they produce irregularly shaped dot boundaries, especially if the screens are generated at low recorder resolutions. For example, with a 133 lines per inch screen at a resolution of 1200 micro dots per inch), the microscopic quality of the dot shapes is quite unacceptable. Not only is the serration of such halftone dots displeasing when looked at under a microscope, it is also the source of additional "dot gain" when such a screen is printed on a press, since press gain is closely related to the halftone dot circumference. The irregularity of the dot boundary also leads to dot-to-dot differences in press gain, resulting in an increase of the overall noise level of the reproduced image.

OBJECTS OF THE INVENTION

It is accordingly a general object of the invention to provide an improved halftone screen.

It is a specific object of the invention to provide a halftone screen in which periodical dot shape and position deviation in the halftone screen are broken up with the introduction of a minimum amount of irregularities in the boundaries of the halftone dot.

It is another object of the invention to provide a method for producing a halftone screen that utilizes a preangled and prescaled threshold matrix that eliminates the need for subsequent rotation of recorder position coordinates.

It is a further object of the invention to provide a halftone screen in which the actual centers of gravity of the halftone dots are positionally displaced from the theoretical centers of gravity by the length and angle of random phase vectors.

It is still a further object of the invention to provide a halftone screen in which the actual centers of gravity of the dots are positionally displaced from the actual centers of gravity by the length and angle of random phase vectors where the length of the vector is related to dot size or tone.

It is another object of the invention to provide a screen generator for producing such screen.

BRIEF SUMMARY OF THE INVENTION

A halftone screen generator produces a halftone screen in which the actual centers of gravity of the halftone dots are positionally displaced from the theoretical centers of gravity by the length and angle of random phase vectors. In one embodiment the shift in position of the actual centers of gravity is dot size dependent in an inverse relationship.

BRIEF DESCRIPTION OF THE DRAWINGS

The objects and features of the invention will best be understood from a detailed description of a preferred embodiment, selected for purposes of illustration and shown in the accompanying drawings in which:

FIG. 7a depicts the dot center position before displacement;

FIG. 9b illustrates the result of adding a random phase vector to the dot centers of the screen shown in FIG. 9a;

FIG. 10b illustrates the affect of the addition of a random phase vector to the dot center of FIG. 10a;

FIG. 12 is a flow diagram illustrating the calculation of a TS*TS sized threshold matrix;

DETAILED DESCRIPTION OF A PREFERRED EMBODIMENT

Figure 7B:
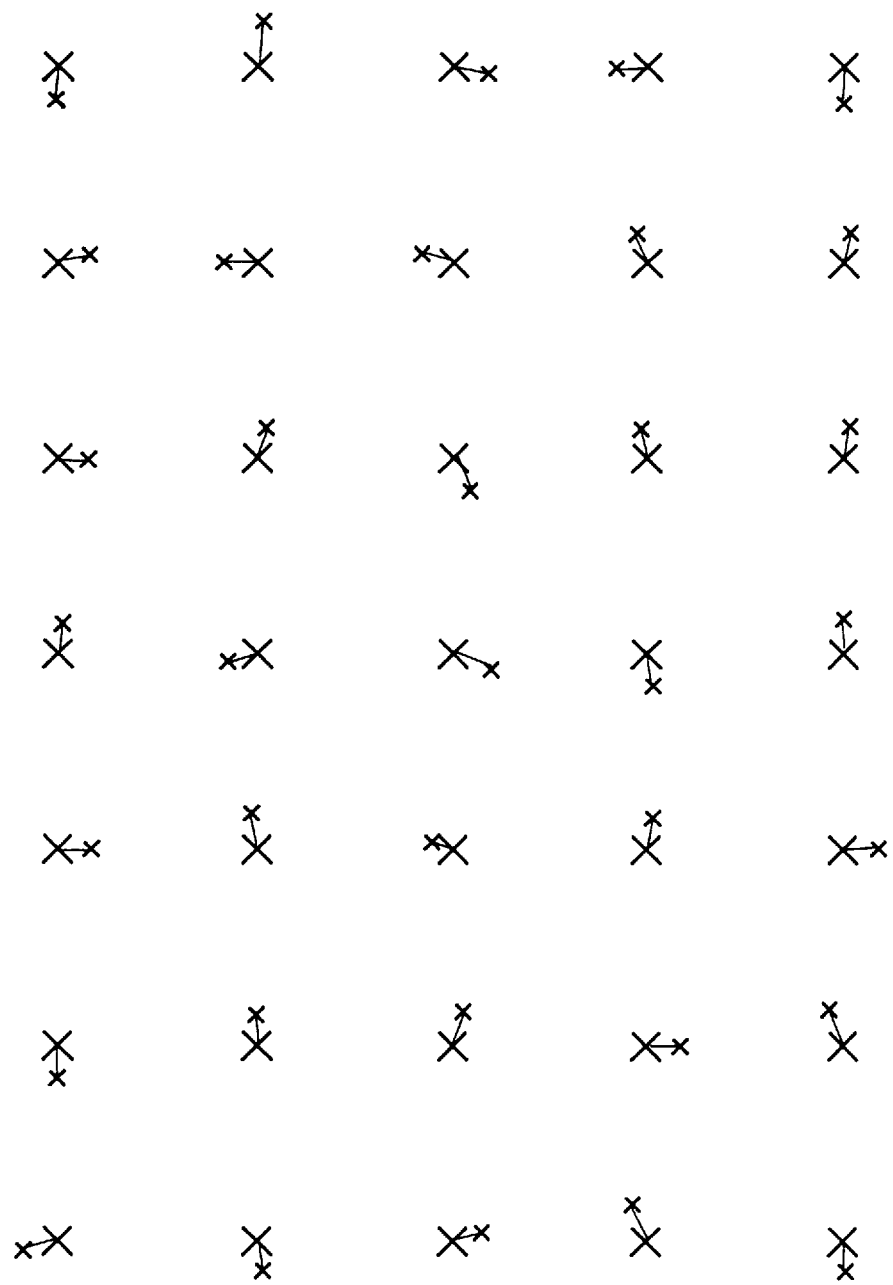
FIG. 7b shows the dot center position produced by the addition of a random phase vector to the original dot center.
Figure 7C:
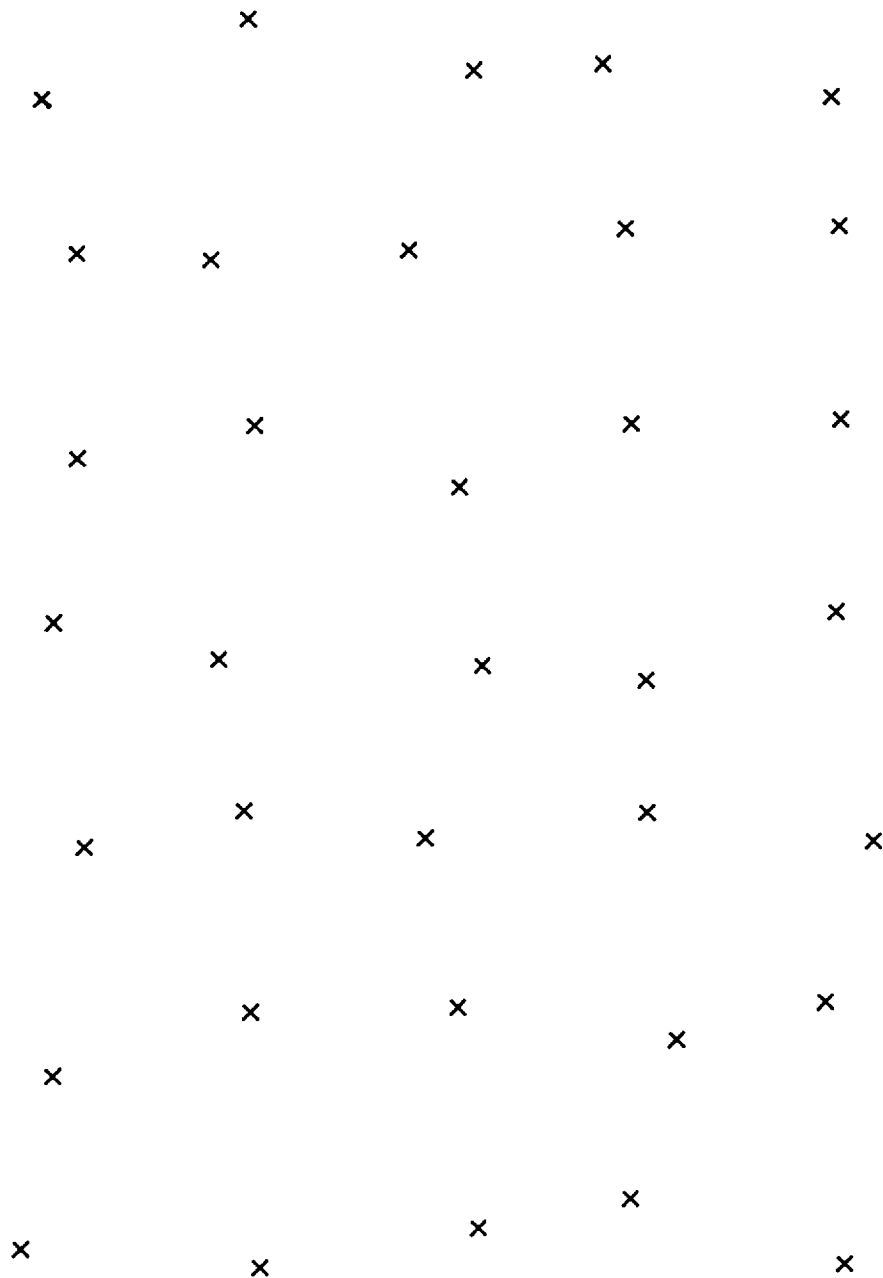
FIG. 7c illustrates the dot center position after displacement.

The invention utilizes the addition of random numbers with a limited range to the position coordinates of the theoretical CENTERS of the halftone dots. Since every halftone dot has only one theoretical center, this method is fundamentally different from the prior art approaches in which random numbers are added to the coordinates of every position at which the screen function is sampled. FIGS. 7a–c explain this in more detail. FIG. 7a represents the dot centers of a halftone screen before any displacement has taken place. FIG. 7b shows the addition of a random phase vector to the original dot centers. FIG. 7c shows the new dot centers after the displacement.

Figure 8A:
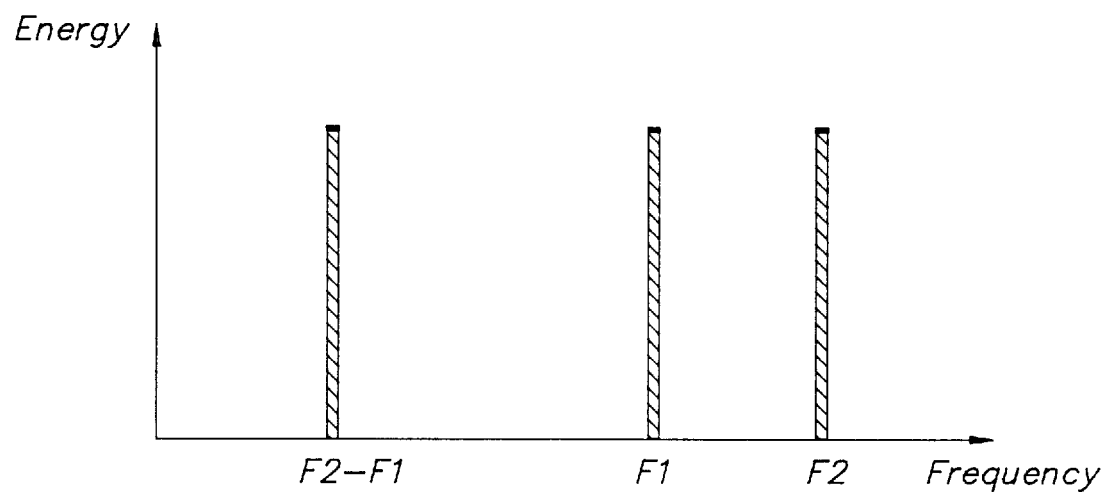
FIG. 8a depicts the diffusion of moire energy over a frequency band by the addition of a random phase vector to one of the two components that produces the moire.
Figure 8B:
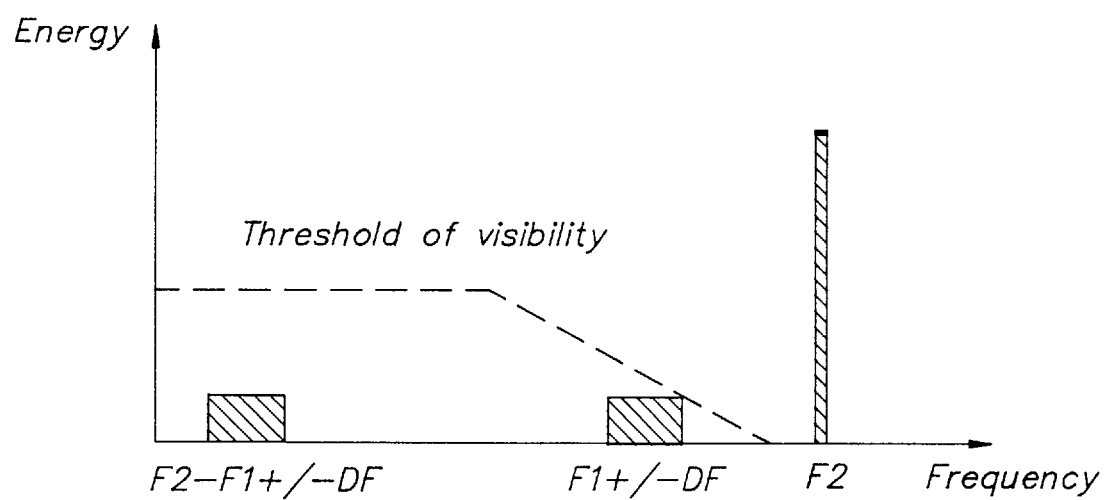
FIG. 8b illustrates the possibility that the energy per unit of frequency can fall below the threshold of visibility.

FIG. 8 illustrates that, if periodical phase distortions between the theoretical and actual dot center positions are the result of a moire interaction between the frequencies of the screen and the recorder grid (FIG. 8a), the addition of a random phase vector to the position of the halftone dot centers will diffuse the moire over a frequency band (FIG. 8b). The total amount of moire energy will be the same, but the maximum energy per unit of frequency will be lower, and can fall below the visible threshold or below the level of noise energy that is already present in the pixel data that is to be halftoned.

Figure 9A:
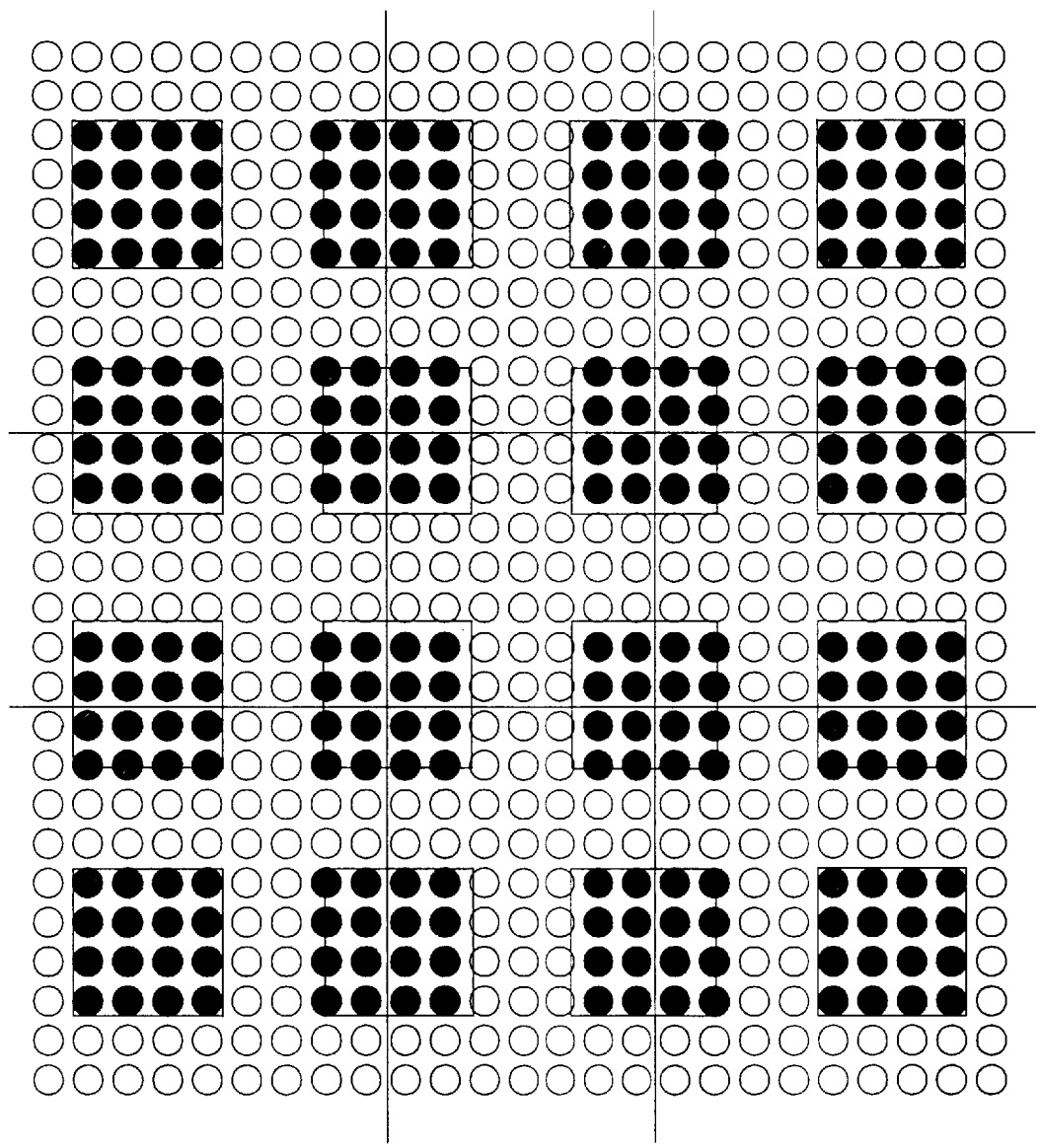
FIG. 9a illustrates a halftone screen with periodical phase distortion before any dot center displacement.
Figure 9B:
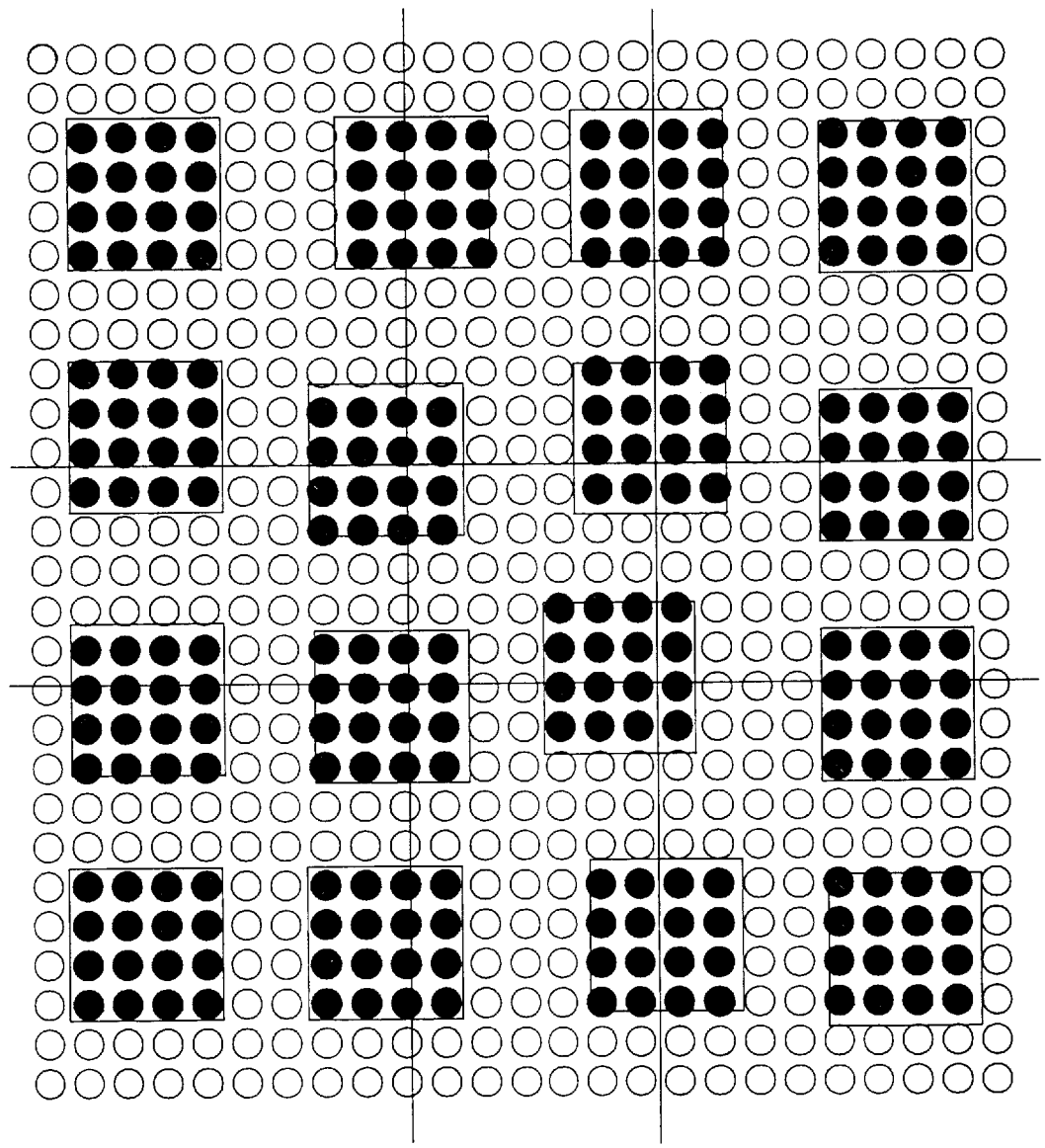

FIG. 9a shows an enlargement of a halftone screen without the addition of random numbers to the dot centers. The periodical phase distortions are clearly visible. FIG. 9b shows the same halftone screen, but with the addition of a random phase vector to the original dot centers. The random phase vector causes the halftone dot to shift in a probabilistic way. If the phase of a set of actual halftone dots was correct before the displacement, the addition of the random phase vector will not change the "average" position of these dots. However, if the phase of a set of actual halftone dots was off with respect to the theoretical phase, then the addition of the random phase vector to the dot centers will correct the "average" phase. FIG. 9b also shows that, contrary to what would have been obtained using one of the previously described prior art methods, no additional serration of the dots has been introduced by adding the random phase vector.

Figure 1:
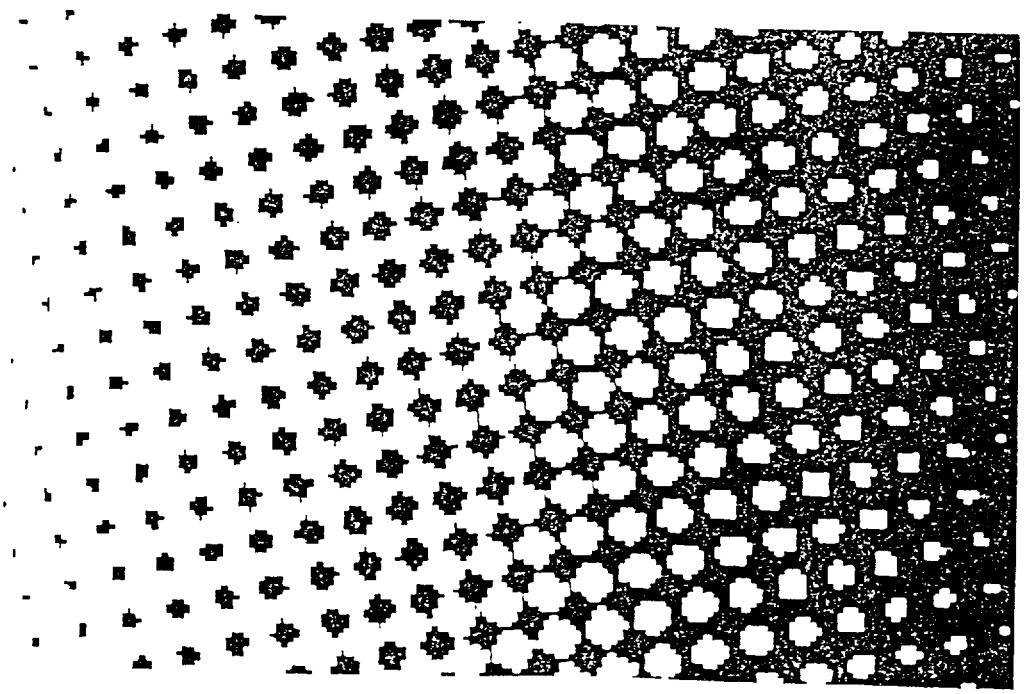
FIG. 1 illustrates the rendering of different shades of a degrade by means of digital halftone dots with different sizes.
Figure 2A:
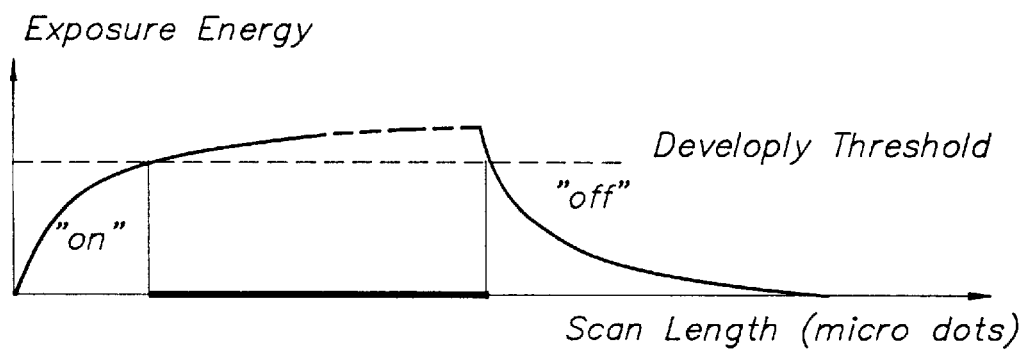
FIG. 2a illustrates the rise and fall of energy of a scanning beam laser in time with the ON and OFF action of an optical modulator.
Figure 2B:
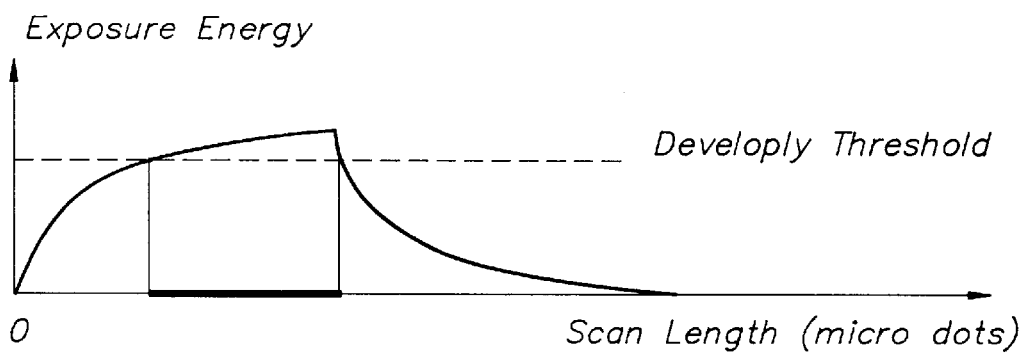
FIG. 2b depicts how long the black line is on film if the optical modulator turns on the laser beam for one micro dot.
Figure 2C:
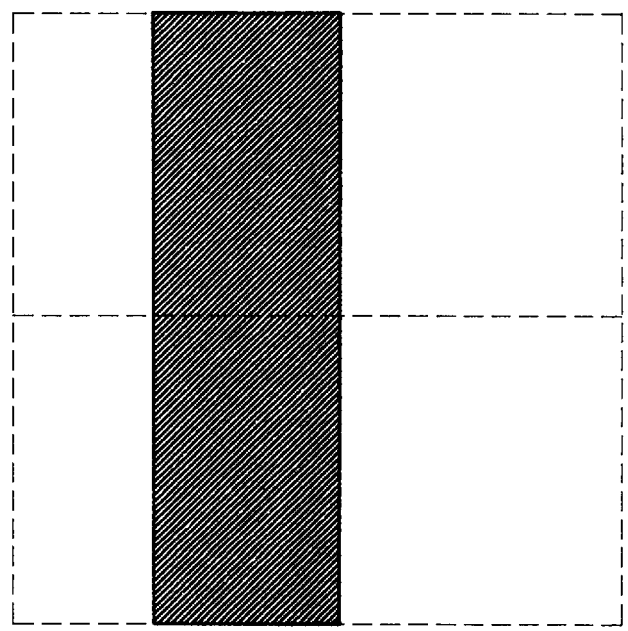
FIG. 2c depicts the black areas on the film for a halftone dot formed from two vertically oriented micro dots.
Figure 2D:
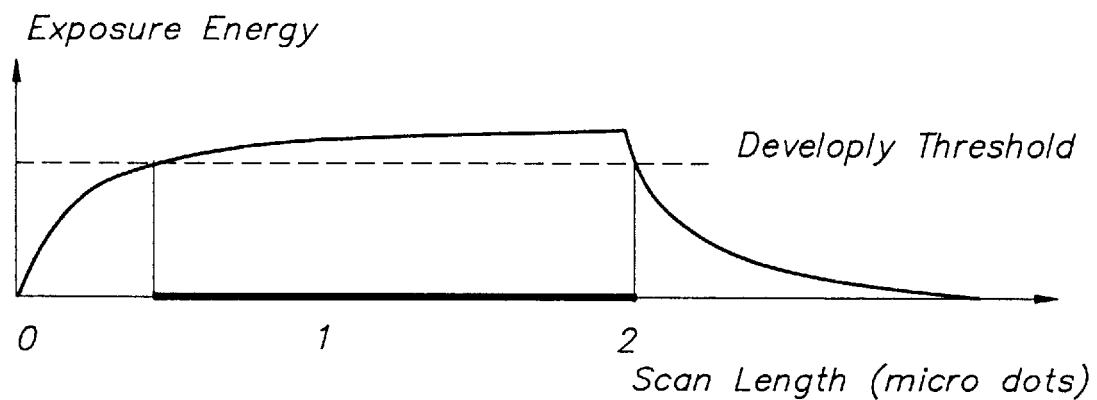
FIG. 2d depicts how long the black line is on film if the optical modulator turns on the laser beam for two micro dots.
Figure 2E:
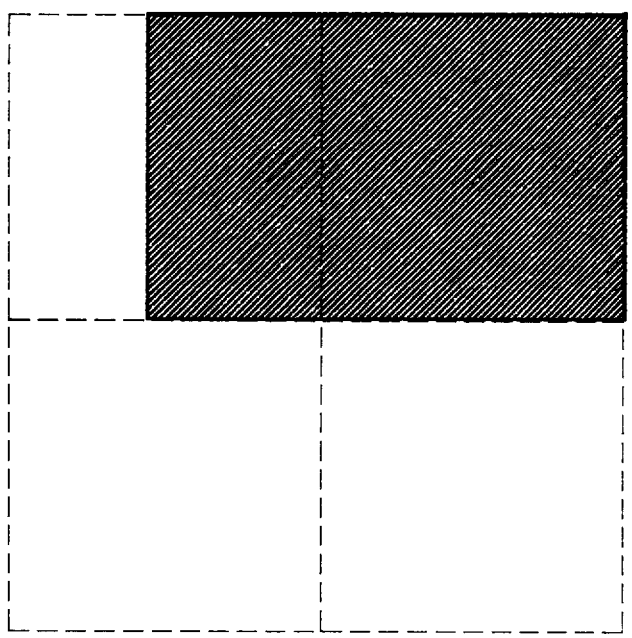
FIG. 2e depicts the black areas on the film for a halftone dot formed from two horizontally oriented micro dots.
Figure 3:
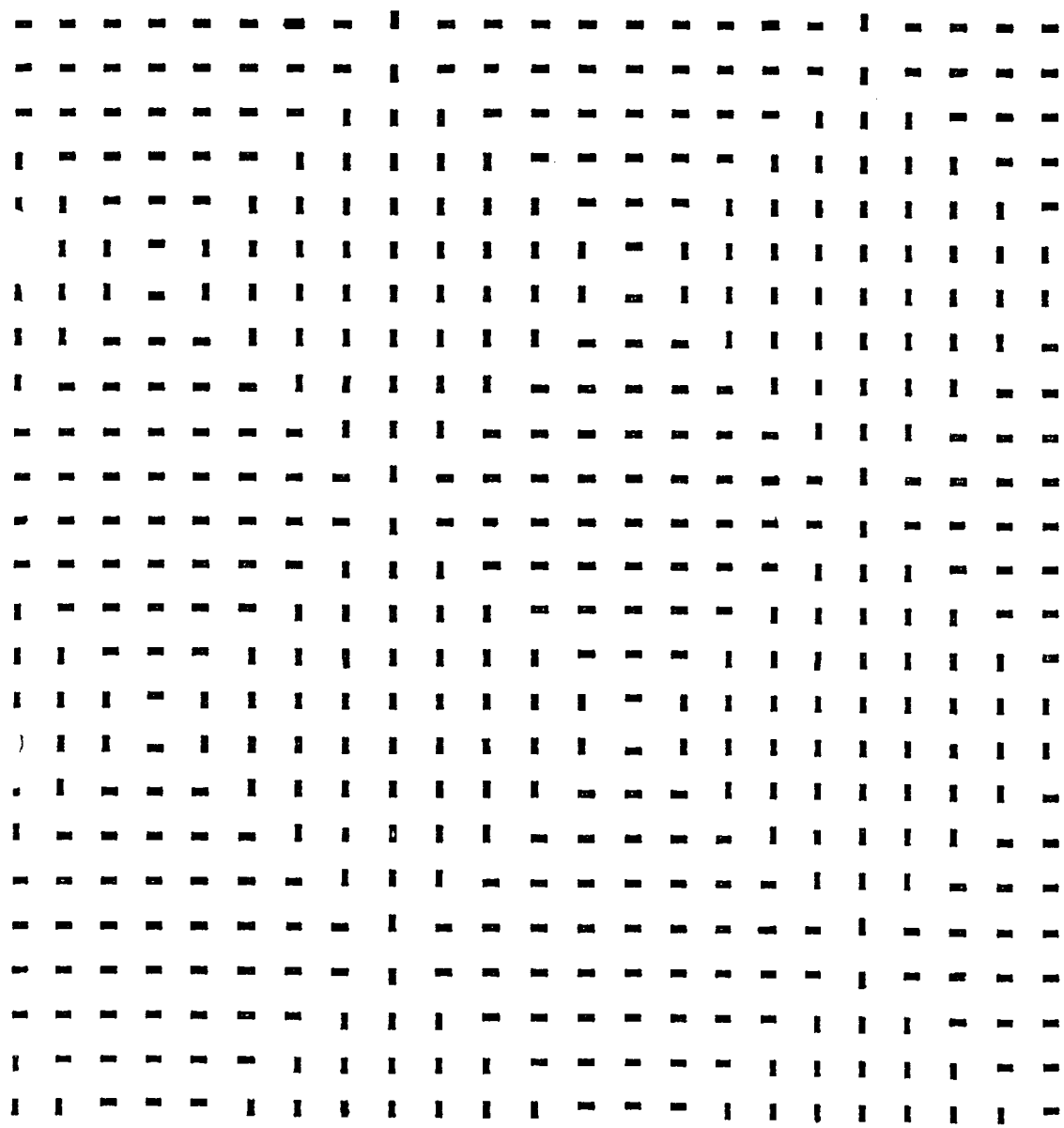
FIG. 3 is a halftone dot pattern in which the halftone dots of FIG. 2 occur in groups to produce an objectionably low frequency periodical density pattern.
Figure 4:
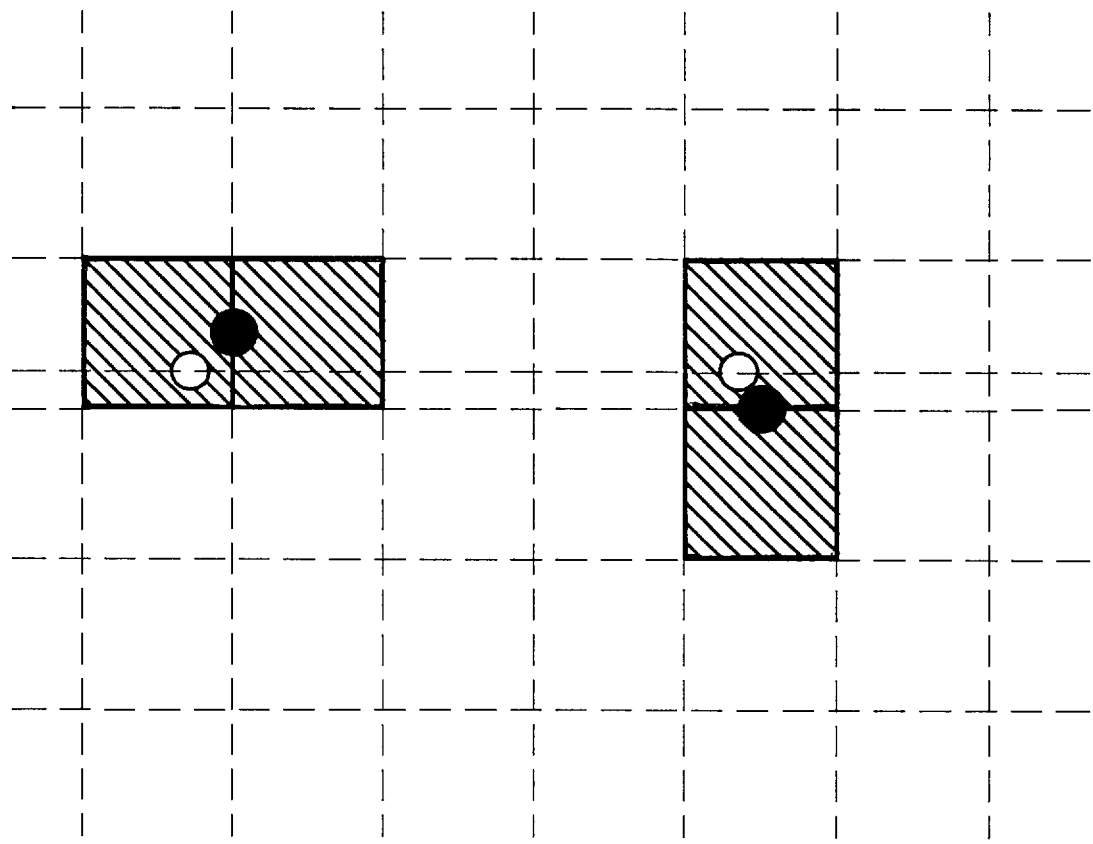
FIG. 4 illustrates how the "theoretical" and "actual" centers of gravity of the halftone dots can vary.
Figure 5:
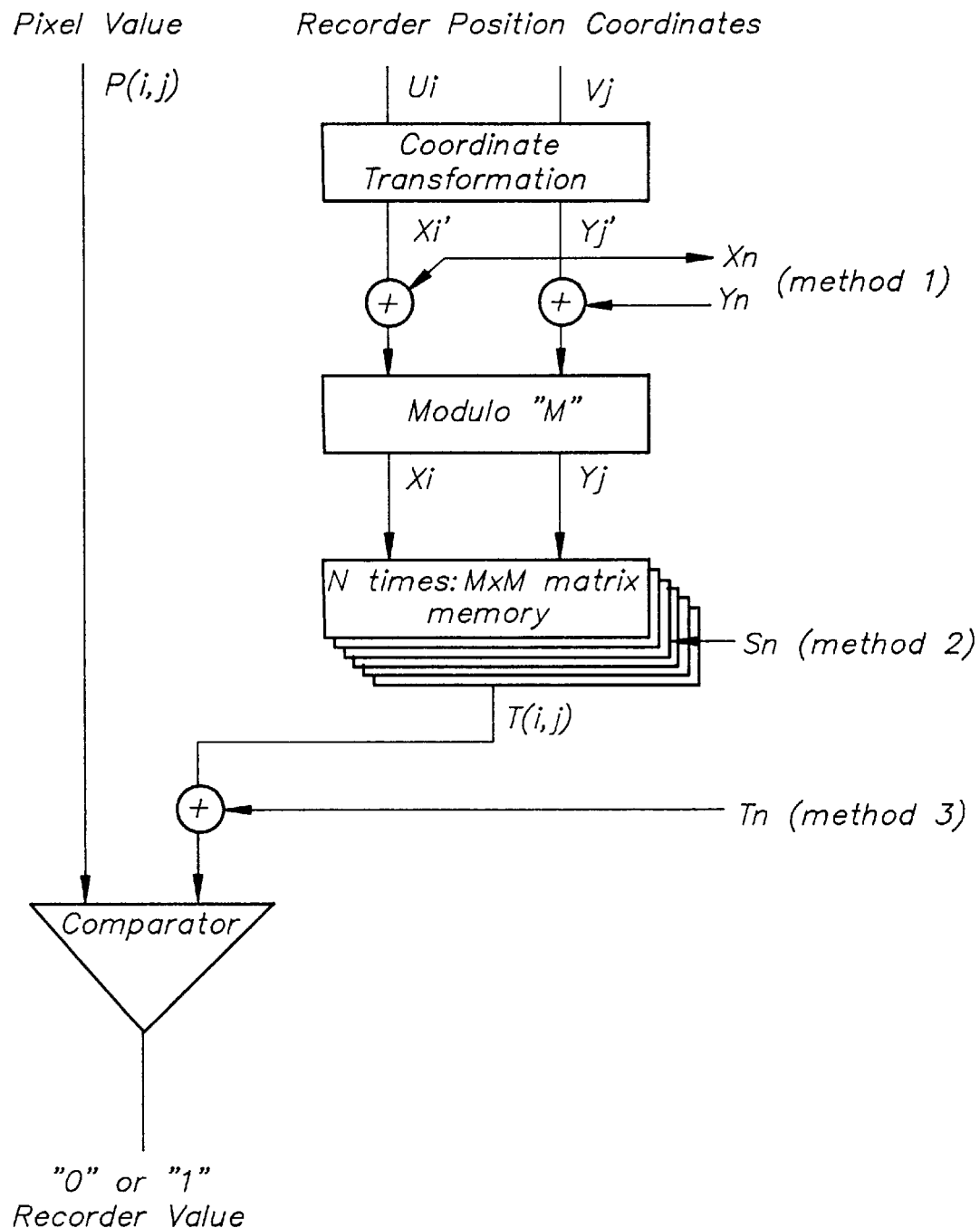
FIG. 5 depicts in simplified form a prior art halftone dot screen generator.
Figure 6A:
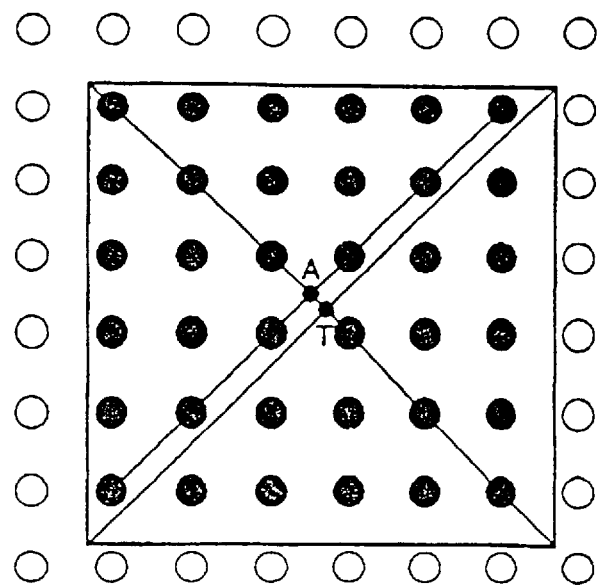
FIG. 6a illustrates the variations in the "theoretical" center of gravity of a halftone dot and the "actual" center of gravity of a cluster of micro dots.
Figure 6B:
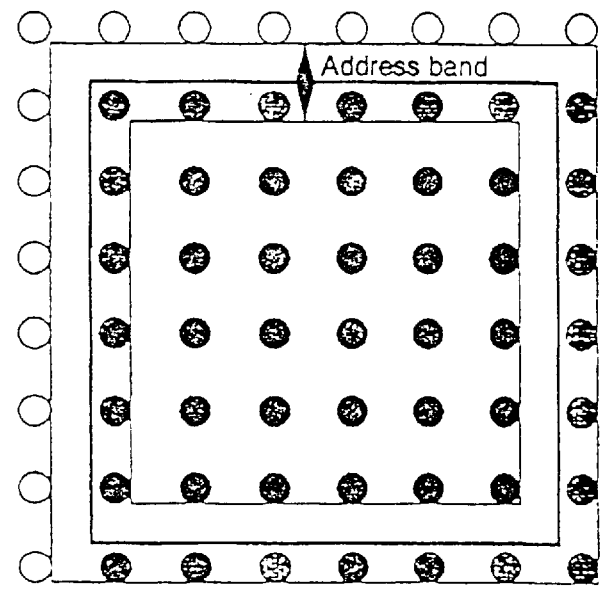
FIG. 6b illustrates the addition of random numbers to the position coordinates of the recorder elements.
Figure 6C:
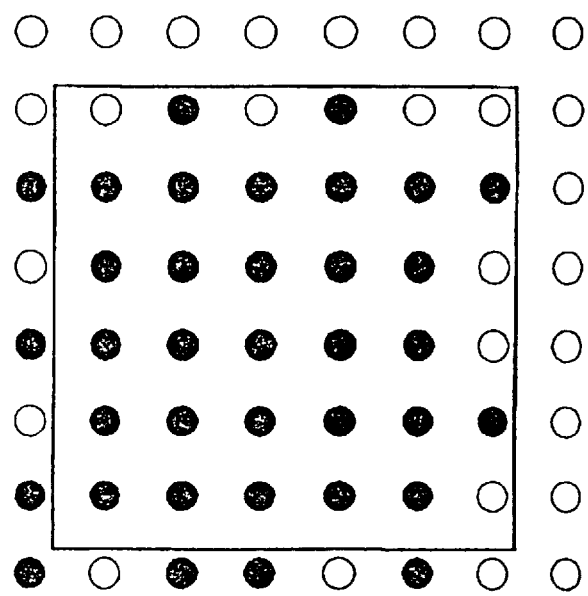
FIG. 6c illustrates one possible configuration as a result of the probabillistic selection of micro dots along the "address band" around the theoretical halftone dot boundary of FIG. 6b.
Figure 10A:
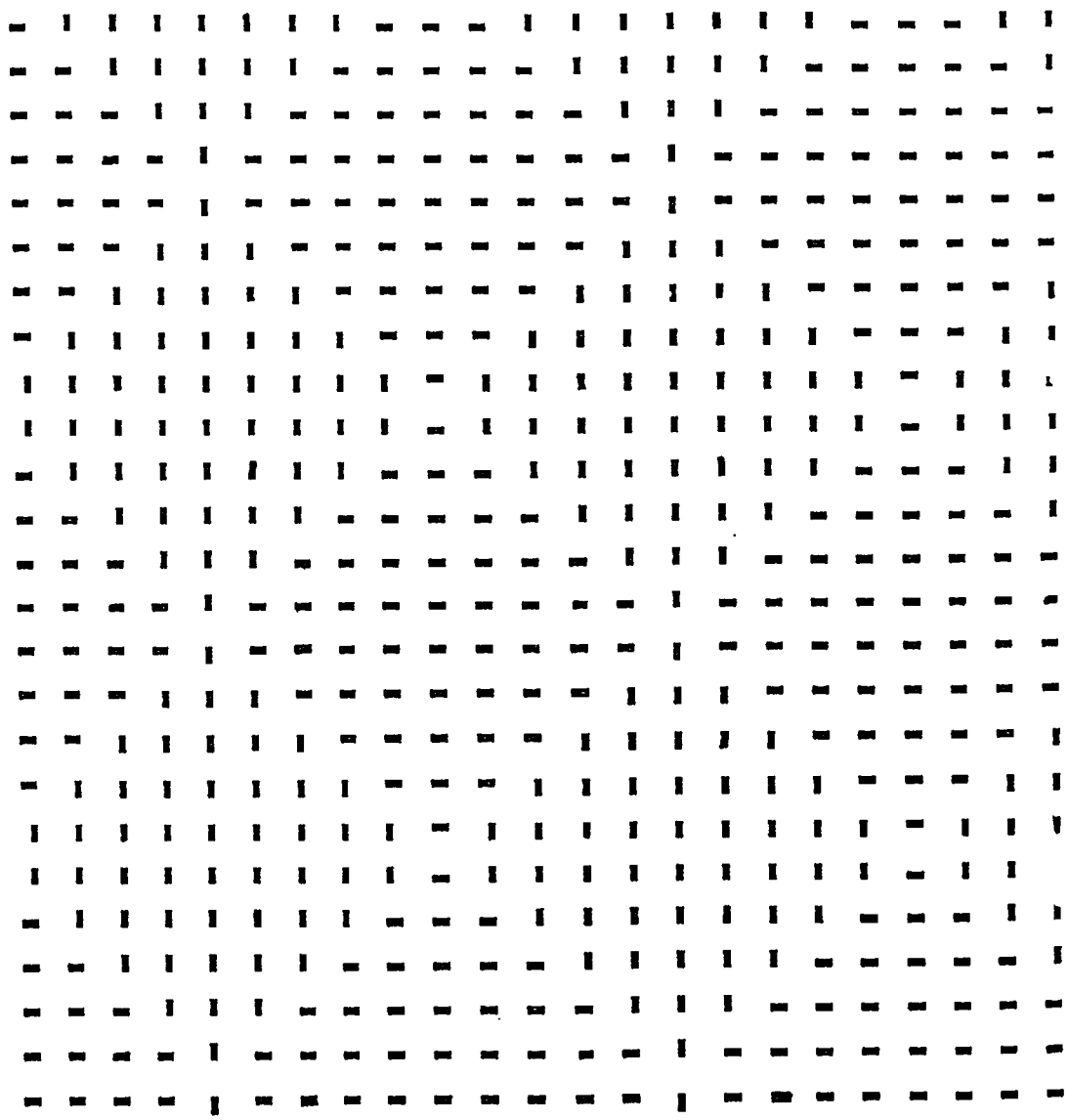
FIG. 10a depicts a halftone pattern of a mixture of halftone dots with two micro dots horizontally and vertically oriented.
Figure 10B:
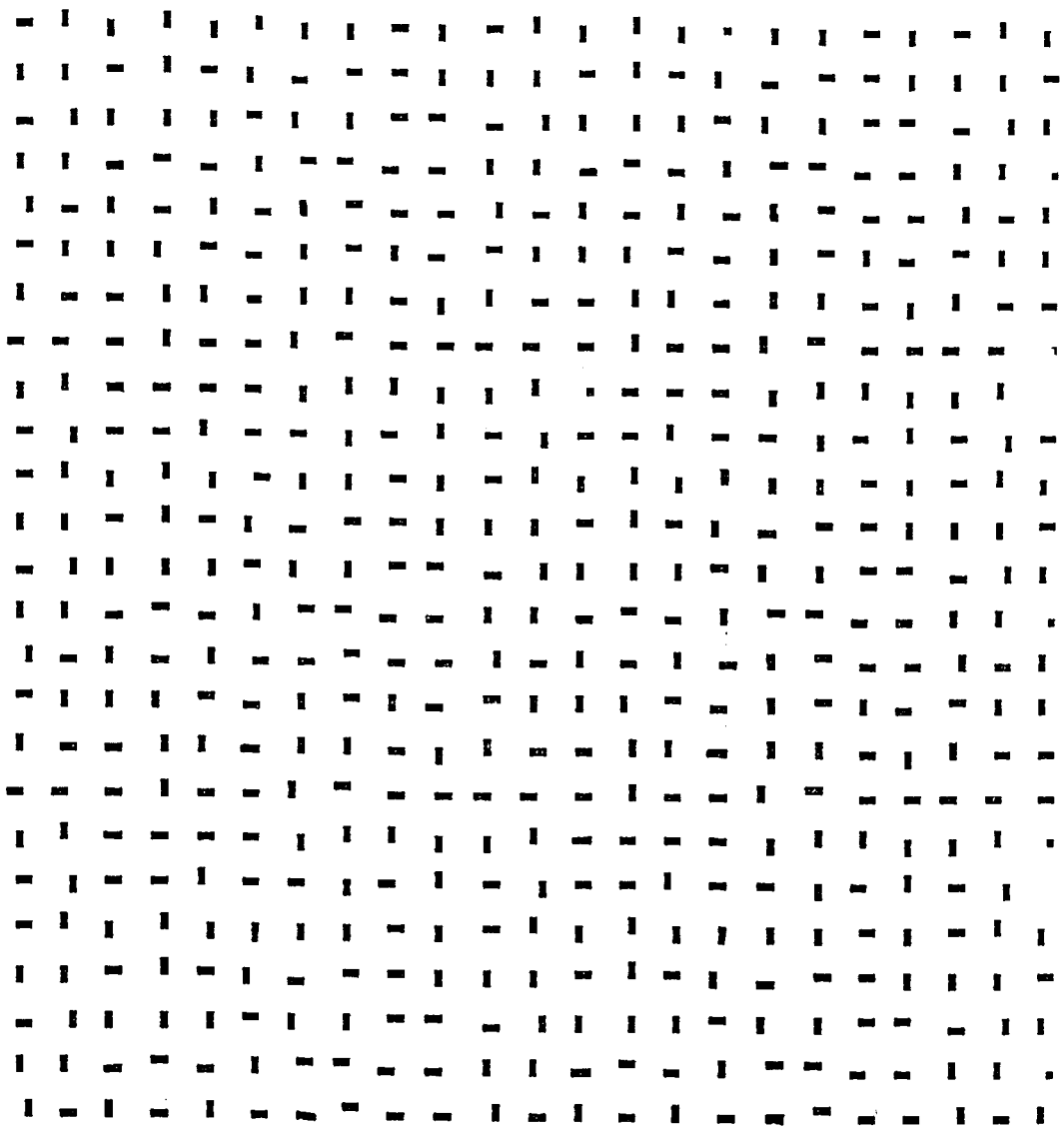

FIG. 10a is identical to FIG. 3, and shows the problem of "grouping" of halftone dots with identical dot shapes, which, as mentioned previously, can indirectly lead to unwanted density patterns. Figure 1ob demonstrates that the addition of a random phase vector to the the halftone dot centers is capable of breaking up this "grouping", thus eliminating the unwanted density patterns that can result from it.

Figure 11:
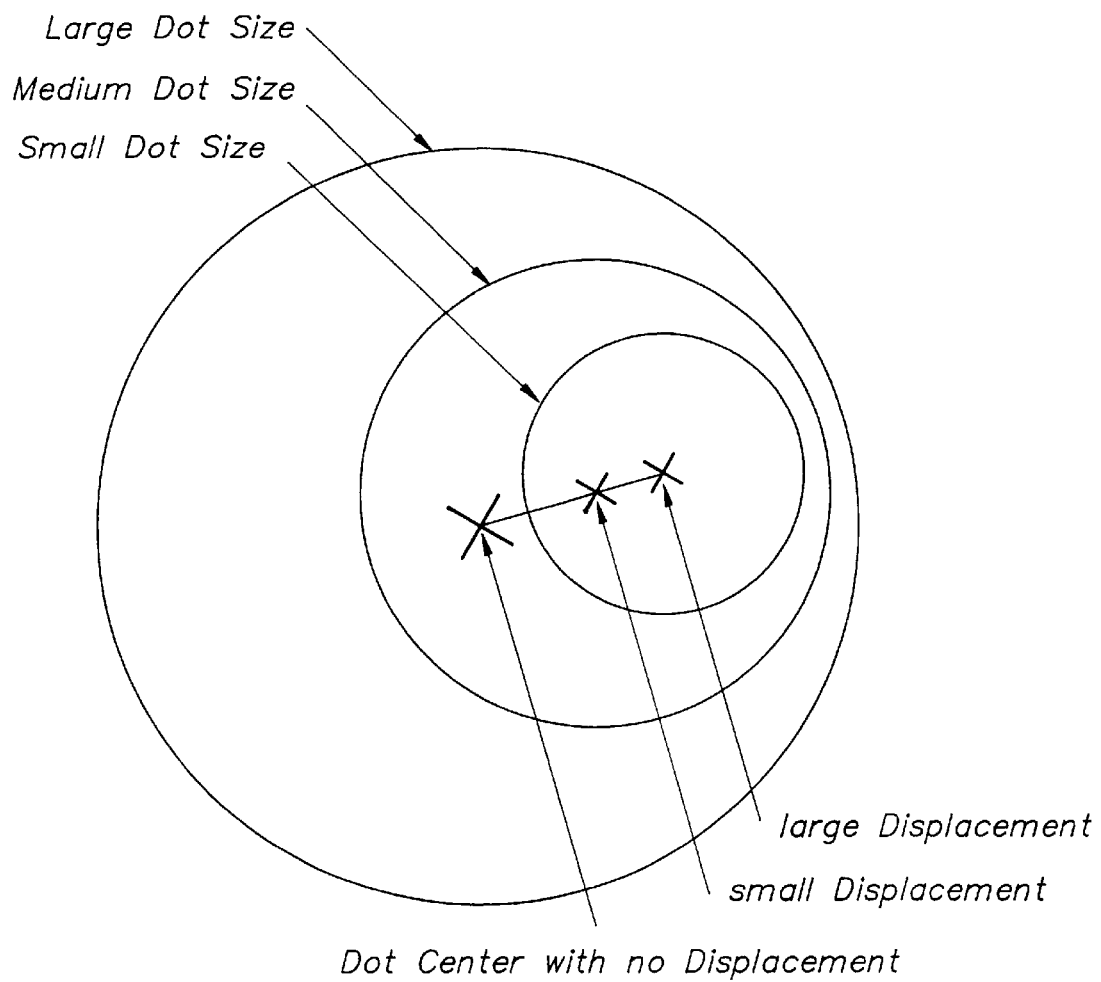
FIG. 11 illustrates an embodiment in which the positional displacement of the "actual" center of gravity of the dots is related to dot size.

It was previously mentioned that the problem of "halftone dot positioning" is more difficult to resolve when the halftone dot is composed of a small number of micro dots, i.e. when the halftone dot is small, as opposed to when it has a large number of micro dots, i.e. when it is large. It should be understood that the addition of phase noise to the halftone dot centers will have a more noticeable effect when the dots are large as compared to when they are small. In other words, the same amount of random phase displacement of the halftone dot centers contains less noise energy when the halftone dots are small, as opposed to when they are large. Given these constraints, the amount of random phase displacement can be made dot size—or alternatively—tone dependent. FIG. 11 shows how the displacement by a phase vector can be made large for small dots, and how the length of the vector is reduced for larger dots.

The random phase vector method can be used to produce "super cells". A supercell contains a set of $Ts_H$ by $Ts_V$ ("Ts refers to horizontal and vertical tile size") threshold values in a square matrix. Every threshold value is compared with a pixel value, and based on the outcome of this comparison, the corresponding micro dot on the recorder grid is turned "on" or "off".

Figure 12A:
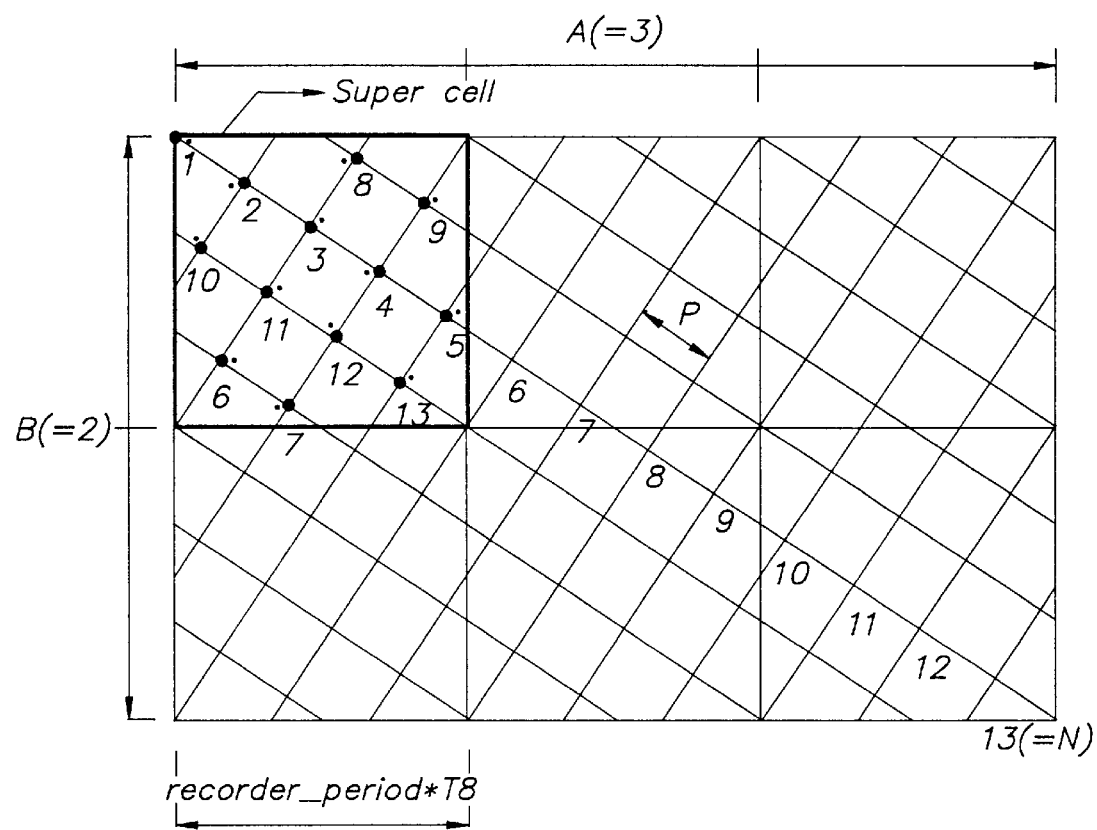
FIG. 12a depicts the geometrical relations of a screen generated by a super cell with multiple "prerotated" halftone dots.
Figure 12B:
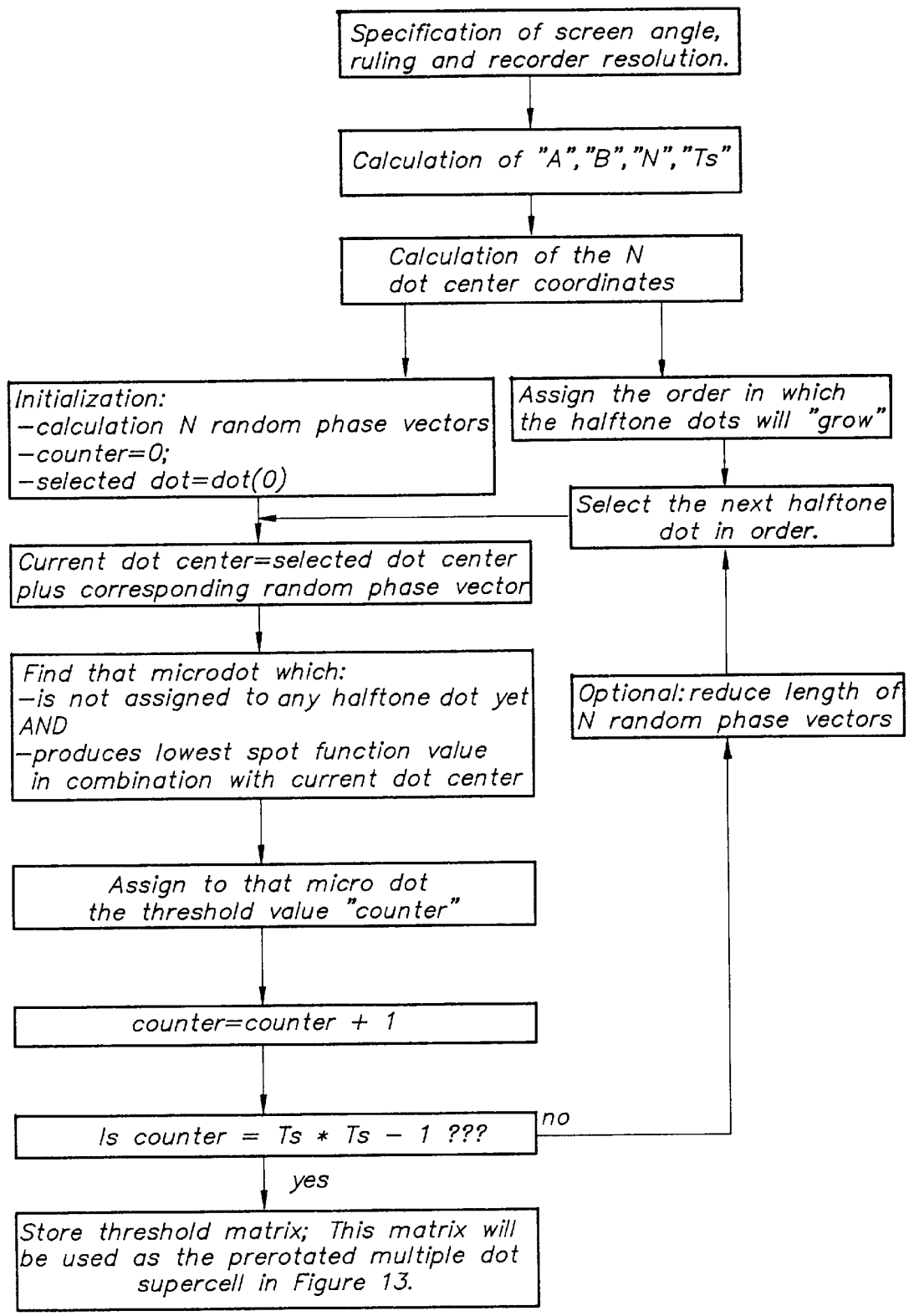
FIG. 12b is a flow chart illustrating the calculations of the prerotated super cell of FIG. 12a; and, FIG. 13 is a schematic diagram of a recorder and scanner utilizing the prerotated multiple dot halftone cell.

FIG. 12a shows the geometrical relations of a screen generated by a super cell with multiple "prerotated" halftone dots. The angle of the screen that will be generated by the supercell is determined by the arctangent of the ratio of "A" and "B". Since these are integer numbers, the angle of the screen will have a rational tangent. This is a property of all the supercell based screening techniques. The drawing also shows that the screen contains an internal two dimensional periodicity. The complete screen can be constructed by replicating horizontally and vertically one of the square areas that is indicated on FIG. 12a. From this follows that it is sufficient to calculate the threshold values for an area that corresponds with such a square area. Hence the concept of "multiple dot prerotated halftone cell" or "super cell". From FIG. 12a follows also:

Screen angle=alfa=arctan(A/B)
Screen ruling=1.0/Screen Period
Recorder resolution=res=1.0/Recorder Period
Screen period=P=Recorder period*Ts/square_root (A*A+B*B)
Number of dots in cell=N=A*A+B*B FIG. 12b shows a flow chart to calculate such a prerotated super cell. The first step is to define the specifications for the desired screen angle, ruling, and the recorder resolution for which the screen will be made.

Two numbers A and B are then found in the second step to approximate the desired screen angle "alfa" with sufficient accuracy. This is done iteratively as follows, if alfa is smaller than 45 degrees:

```
tan_alfa = tangent (alfa);
A = 1;
do until "arctan(A/B)" appoximates "alfa" sufficently close
    {
    B = round(A/tan_alfa)
    A = round(B*tan_alfa)
    }
alfa = arctan(A/B)
```

If alfa is greater than 45 degrees, then first the A and B numbers are determined for 90 degrees minus alfa. "alfa" itself is then approximated by arctan(B/A). "Ts" and "N" are calculated as:

Ts=roundoff(sqrt(A*A+B*B)*res*P);
N=A*A+B*B;

In the third step the theoretical dot centers (Xi,Yi) of the N halftone dots in the supercell are calculated as follows: for i=0 to N-1:

```
{
Xi = i*P*cos(alfa);
Yi = i*P*sin(alfa);
}
```

In the fourth step, an order is determined in which micro-dots will be added to the halftone dots in the supercell as they grow from 0% to 100%. One technique is to add the first micro dot to the dot with number "1" on FIG. 12a, the second to the dot with number "2", and so on. After that one micro dot has been added to each of the N halftone dots, a second micro dot is added to all of them in the same order. This process continues until all micro dots are assigned to halftone dots.

An alternative and better technique assigns a first micro dot to all of the halftone dots in a random permutation, then adds a second micro dot to all of the halftone dots using a different permutation, and continues in this manner until all micro dots have been assigned.

An even better technique produces halftone dot growth in a manner that the "average distance" between dots of different sizes (the ones that have received one micro dot more as opposed to the others) is maximized under all circumstances.

The fifth step initializes a variable "counter" that keeps track of how many micro dots have already been assigned to halftone dots in the main loop, initializes a dot selection mechanism to the first halftone dot in order, and calculate a set of random phase vectors by means of a random number generator.

The sixth step is the first step of the main loop. In this step, a pair of coordinates is calculated by adding the theoretical dot center coordinates with the corresponding random phase vector coordinates. This coordinate sum is called the "current dot center coordinates".

The seventh step searches for that micro dot around the current dot center, that is not assigned yet to that or any other dot, and that produces the lowest value when evaluated into the spot function in combination with the current dot center.

In the eighth step, the micro dot of step 7 is then assigned to the "current dot", by marking it up as "being already assigned", and by storing the value of the variable "counter" in a Ts by Ts sized threshold matrix at the positions (i,j) that are derived from the coordinates (ti,tj) of the found microdot as follows:

i=modulo(ti,Ts)
j=modulo(tj,Ts)

The "modulo" operation is used because the micro dot with coordinates "ti" and "tj" may have been bound outside the supercell boundary. For example, this would be the case for all the micro dots that will be assigned around the dots with numbers higher than 6 in FIG. 12a.

The ninth step increments the counter.

In the tenth step, the value of the counter is checked. If it is equal to Ts*Ts, it means that a total of Ts*Ts micro dots has been assigned to the halftone dots of the supercell, and that all of the micro dots have received a threshold value. In that case, the prerotated multiple dot supercell is ready for use (Step 11).

In the other case (Step 13), the next halftone dot for which is micro dot will be searched is selected, after which Steps 6 to 10 are repeated.

In an optional twelfth step, the length of the random phase vectors can be reduced to reduce the amount of random phase displacement of the dot centers for larger dots, as compared to for the smaller dots.

Figure 13:
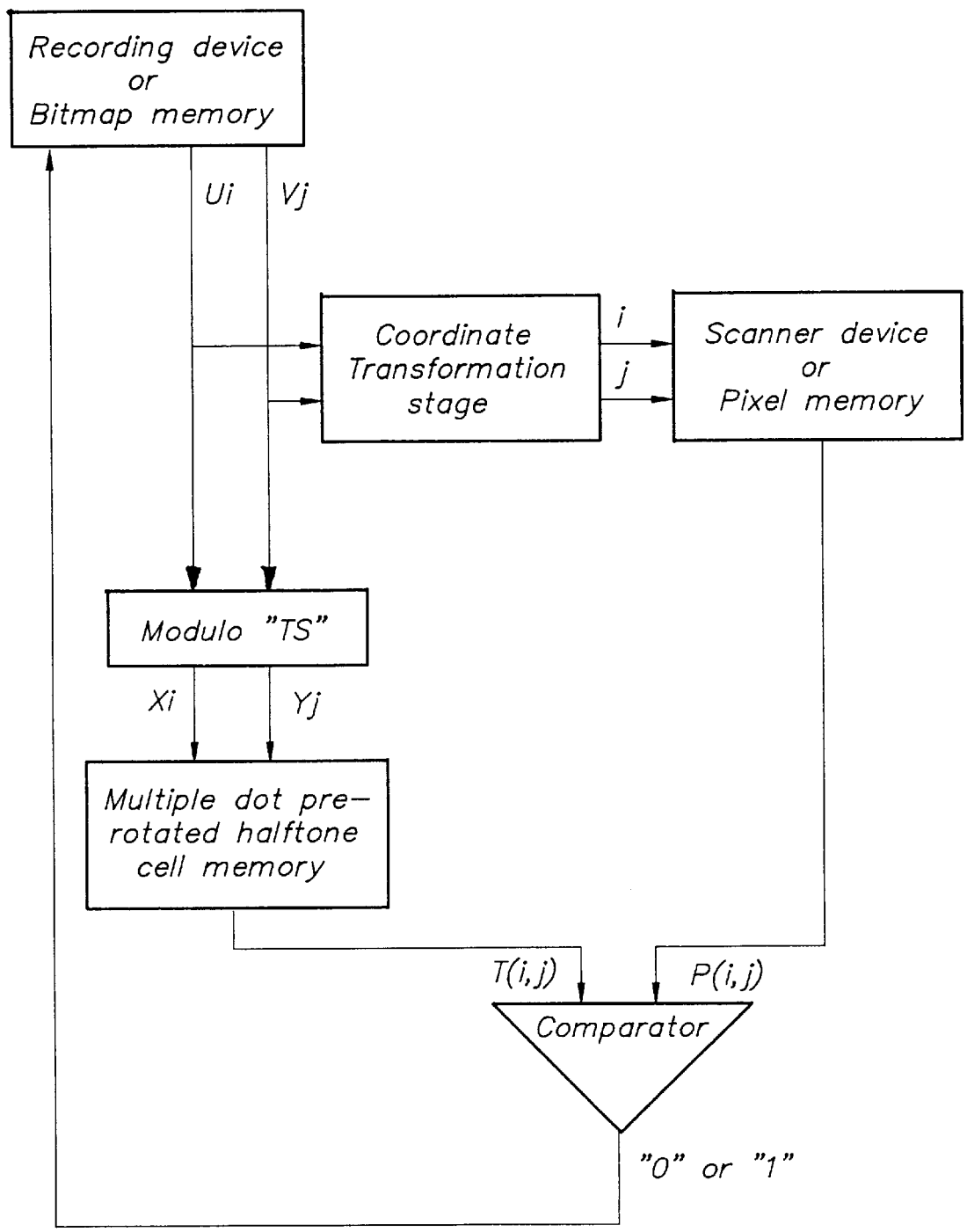

FIG. 13 illustrates the hardware to halftone images by means of the prerotated multiple dot halftone cell.

The recorder drives the datarates in the hardware and is, therefore, called the "master". (Ui,Vj) are pairs of coordinates that are generated by the recorder and that correspond to physical locations on the addressable grid of the recorder. By means of a "modulo Ts" operation, these coordinates are mapped into the corresponding coordinates (Xi,Yi) of one two dimensional period or super cell of the halftone screen. For every position (Xi,Yi) within that period is available a threshold value T(Xi,Yj) in the Ts by Ts sized matrix that is calculated by means of the flow chart in FIG. 12b.

The recorder position coordinates (Ui,Yi) are also transformed by means of a stage, capable to rotate, scale and shift coordinates to the coordinate system of the scanner. For every pair of coordinates (Ui,vj), a pair of image coordinates is calculated that addresses a corresponding pixel value P(i,j).

Depending on the comparison of the threshold value T(Xi,Yj) and pixel value P(i,j), a "black") or "white" micro dot is written by the recorder on the substrate.

It will be appreciated that the scanner device can be replaced by a pixel memory and that the recorder can be replaced by a bitmap memory.

In yet another variation, which is able to achieve better quality, but also requires more computational power, the coordinate transformation stage and pixel memory are replaced by combination of a two dimensional "resampling" or "interpolation" unit with a pixel memory.

Having described in detail a preferred embodiment of the invention, it will now be apparent to those having skill in the art that numerous modifications can be made therein without departing from the scope of the invention as defined in the following claims.

What I claim is:

1. A halftone recording apparatus comprising:
   (a) a marking engine for recording micro dots on an addressable grid on a recording medium, said marking engine also producing pairs of coordinates (Ui,Vj) that correspond to physical locations on said addressable grid;
   (b) a mapping means for mapping the pairs of coordinates (Ui,Vj) into corresponding coordinates (Xi,Yj) of a prerotated, multiple dot supercell in which at least some dots have their actual centers of gravity positionally displaced from their theoretical centers of gravity by the length and angle of random phase vectors;
   (c) a means for generating a threshold value T(Xi,Yj) for every position (Xi,Yj) within said supercell;
   (d) a means for image scanning a medium, said means for image scanning having a coordinate system;
   (e) a means for transforming the pairs of coordinates (Ui,Vj) into the coordinate system of said means for image scanning to produce a pair of image coordinates associated with a corresponding pixel value P(i,j) from said means for image scanning;
   (f) a means for comparing the threshold value T(Xi,Yj) and the pixel value P(i,j), said comparing means producing a signal representative of the results of the comparison; and,
   (g) a means responsive to said signal for controlling the recording of said marking engine on the recording medium.

2. A halftone recording apparatus comprising:
   (a) a marking engine for recording micro dots on an addressable grid on a recording medium, said marking engine also producing pairs of coordinates (Ui,Vj) that correspond to physical locations on said addressable grid;
   (b) a mapping means for mapping the pairs of coordinates (Ui,Vj) into corresponding coordinates (Xi,Yj) of a prerotated, multiple dot supercell in which at least some dots have their actual centers of gravity positionally displaced from their theoretical centers of gravity by the length and angle of random phase vectors;
   (c) a means for generating a threshold value T(Xi,Yj) for every position (Xi,Yi) within said supercell;
   (d) a means for storing and retrieving data representative of an original image having a coordinate system;
   (e) a means for transforming the pairs of coordinates (Ui,Vj) into the coordinate system of an image retrieved from said data storing and retrieving means to produce a pair of image coordinates associated with a corresponding pixel value P(i,j) from said retrieved image;
   (f) a means for comparing the threshold value T(Xi,Yj) and the pixel value P(i,j), said comparing means producing a signal representative of the results of the comparison; and,
   (g) a means responsive to said signal for controlling the recording of said marking engine on the recording medium.

3. The halftone recording apparatus of claim 2 wherein said original image is an optical image.

4. The halftone recording apparatus of claim 2 wherein said original image is an electronic image.

5. A halftone recording apparatus comprising:
   (a) a marking engine for recording micro dots on an addressable grid on a recording medium;
   (b) means for producing pairs of coordinates (Ui,Vj) that correspond to physical locations on said addressable grid;
   (c) a mapping means for mapping the coordinates (Ui,Vj) into corresponding coordinates (Xi,Yj) of a prerotated, multiple dot supercell in which at least some dots have their actual centers of gravity positionally displaced from their theoretical centers of gravity by the length and angle of random phase vectors;
   (d) a means for generating a threshold value T(Xi,Yj) for every position (Xi,Yj) within said supercell;
   (e) a means for image scanning a medium, said means for image scanning having a coordinate system;
   (f) a means for transforming said position coordinate pairs (Ui,Vj) into the coordinate system of said means for image scanning to produce a pair of image coordinates associated with a corresponding pixel value P(i,j) from said means for image scanning;
   (g) a means for comparing the threshold value T(Xi,Yj) and the pixel value P(i,j), said comparing means producing a signal representative of the results of the comparison; and,
   (h) a means for storing and retrieving said signal for subsequent use by said marking engine.

6. A halftone recording apparatus comprising:
   (a) a marking engine for recording micro dots on an addressable grid on a recording medium;
   (b) means for producing pairs of coordinates (Ui,Vj) that correspond to physical locations on said addressable grid;
   (c) a mapping means for mapping the coordinates (Ui,Vj) into corresponding coordinates (Xi,Yj) of a prerotated, multiple dot supercell in which at least some dots have their actual centers of gravity positionally displaced from their theoretical centers of gravity by the length and angle of random phase vectors;
   (d) a means for generating a threshold value T(Xi,Yj) for every position (Xi,Yj) within said supercell;
   (e) a means for storing and retrieving data representative of an original image having a coordinate system;
   (f) a means for transforming said position coordinate pairs (Ui,Vj) into the coordinate system of an image retrieved from said data storing and retrieving means to produce a pair of image coordinates associated with a corresponding pixel value P(i,j) from said retrieved image;
   (g) a means for comparing the threshold value T(Xi,Yj) and the pixel value P(i,j), said comparing means producing a signal representative of the results of the comparison; and,
   (h) a means for storing and retrieving said signal for subsequent use by said marking engine.

7. The halftone recording apparatus of claim 6 wherein said original image is an optical image.

8. The halftone recording apparatus of claim 6 wherein said original image is an electronic image.

* * * * *